United States Patent
Swetish

(10) Patent No.: US 6,793,247 B2
(45) Date of Patent: Sep. 21, 2004

(54) ORDER PICKER ANGLED STEERING WHEEL

(75) Inventor: Gary B. Swetish, Racine, WI (US)

(73) Assignee: The Raymond Corporation, Greene, NY (US)

( * ) Notice: Subject to any disclaimer, the term of this patent is extended or adjusted under 35 U.S.C. 154(b) by 47 days.

(21) Appl. No.: 10/189,981

(22) Filed: Jul. 3, 2002

(65) Prior Publication Data

US 2004/0004349 A1 Jan. 8, 2004

(51) Int. Cl.⁷ ............................................... B62D 1/18
(52) U.S. Cl. ........................................................ 280/775
(58) Field of Search ........................ 280/771, 775; 74/492, 493

(56) References Cited

U.S. PATENT DOCUMENTS

| | | | |
|---|---|---|---|
| 3,807,252 A | 4/1974 | Parr | 74/493 |
| 4,287,787 A * | 9/1981 | Kulhanek | 74/493 |
| 4,392,670 A | 7/1983 | Schultz | 280/775 |
| 4,674,769 A * | 6/1987 | Ota et al. | 280/775 |
| 5,573,273 A * | 11/1996 | Ito | 280/775 |
| D407,177 S | 3/1999 | Henshaw et al. | D34/34 |
| 5,890,562 A | 4/1999 | Bartels et al. | 187/224 |
| 6,182,778 B1 | 2/2001 | Henshaw et al. | 180/89.12 |
| D440,373 S | 4/2001 | Meinhardt | D34/34 |

* cited by examiner

Primary Examiner—Faye M. Fleming
(74) Attorney, Agent, or Firm—Quarles & Brady LLP

(57) ABSTRACT

A vehicle including an operator platform having a platform front end and a platform rear end joined by opposing platform sides. The operator platform is bisected by a longitudinal centerline extending through the front and rear ends. An operator console is mounted relative to the platform and extends along a vertical plane bisected by the longitudinal centerline. The vertical plane is substantially perpendicular to the longitudinal centerline. A steering control mechanism rotatably is mounted to the operator console for rotation about an axis. The axis is arranged to allow natural movement of an operator's wrist to minimize fatigue.

12 Claims, 4 Drawing Sheets

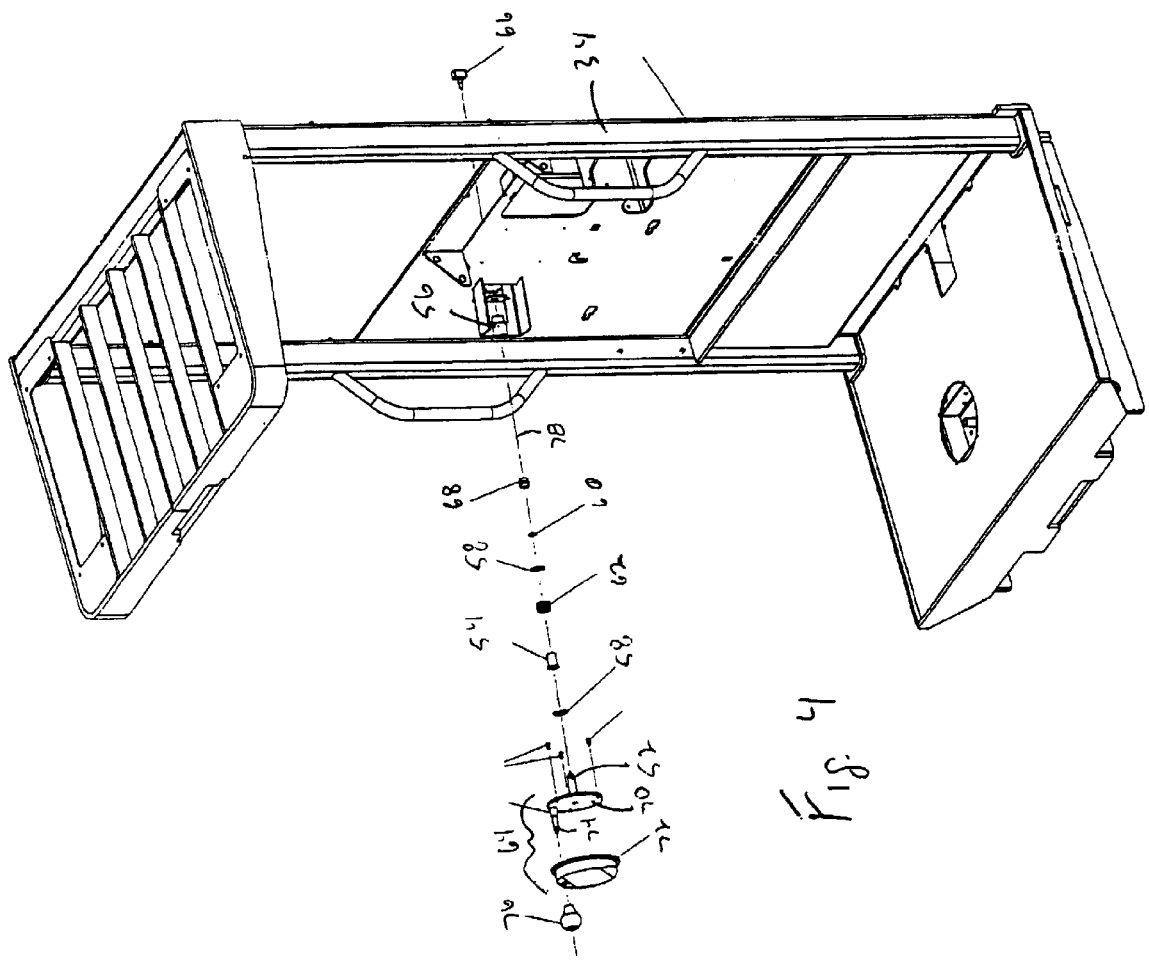

ORDER PICKER ANGLED STEERING WHEEL

CROSS REFERENCES TO RELATED APPLICATIONS

Not Applicable

STATEMENT REGARDING FEDERALLY SPONSORED RESEARCH

Not Applicable

BACKGROUND OF THE INVENTION

The present invention relates to steering control mechanisms for order picker trucks, and more particularly to order picker trucks having a steering control mechanism which reduces operator fatigue.

Order picker trucks are used to pick products from shelves in order to fill a customer order. The products are typically stored in a rack system in which a plurality of unit loads of many products are stored. Each unit load, generally, contains a single type of product, and a customer typically requires one or more boxes of product picked from many different unit loads. This requires an operator to travel up and down one or more aisles of the rack system to pick products from many different locations in the rack system to fill the customer's order.

An order picker truck is typically driven down an aisle by the operator standing on a vehicle operator platform which forms part of the vehicle. The operator drives the vehicle with the left foot on a brake pedal, the left hand on a vehicle steering wheel, and the right hand on a multi-functional control handle. Rotation of the steering wheel changes the angle of a steerable drive tire supporting the vehicle chassis, resulting in a different horizontal direction of travel.

Many methods are known in the art to operatively connect the steering wheel to the steerable drive tire. One known method incorporated into a Raymond Easi OrderPicker includes a rotatable steering wheel rotatably mounted to an operator console, and operatively connected to an encoder. Rotation of the steering wheel operates the encoder which produces a signal corresponding to the direction and degree of rotation. The encoder is electrically connected to a controller, such as a microprocessor, which controls a steering motor linked to the steerable drive tire. The steering motor pivots the steerable drive tire in response to the signals from the controller to steer the vehicle.

The steering wheel of known orderpickers are fixed to a shaft rotatably mounted to the operator console. In one known orderpicker, the shaft is rotatable about an axis which extends perpendicular to a console vertical plane extending between and perpendicular to the orderpicker sides. In another known order picker 1, shown in FIG. 1, the steering wheel shaft axis 2 extends inwardly from the console vertical plane 3, such that the shaft axis 2 defines an obtuse angle A with the console vertical plane 3. As a result, the steering wheel 4 faces an operator standing on the operator platform. As shown in FIG. 2, the shaft axis 2 may also define an angle B with the console vertical plane 3, such that the steering wheel 4 is angled upwardly.

The orientation of the steering wheel can require an uncomfortable operation of an operator's wrist to rotate the steering wheel. Moreover, operation of these known orderpickers over extended periods of time can cause operator fatigue resulting from steering the vehicle. Accordingly, a need exists for a steering wheel configuration which provides a more natural movement for the operator and reduces operator fatigue.

SUMMARY OF THE INVENTION

The present invention provides a vehicle including an operator platform having a platform front end and a platform rear end joined by opposing platform sides. The operator platform is bisected by a longitudinal centerline extending through the front and rear ends. An operator console is mounted relative to the platform and extends along a vertical plane bisected by the longitudinal centerline. The vertical plane is substantially perpendicular to the longitudinal centerline. A steering control mechanism rotatably is mounted to the operator console for rotation about an axis. In one embodiment, the axis is offset from the longitudinal centerline and defines an acute angle and an obtuse angle with the vertical plane. The acute angle is defined rearwardly of the vertical plane and opens away from the longitudinal centerline.

A general objective of the present invention is to provide a steering control mechanism which minimizes operator fatigue. This objective is accomplished by provided an angled steering control mechanism which does not require uncomfortable operation of an operator's wrist.

These and still other objects and advantages of the present invention will be apparent from the description which follows. In the detailed description below, preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

DETAILED DESCRIPTION OF THE INVENTION

Figure 1:
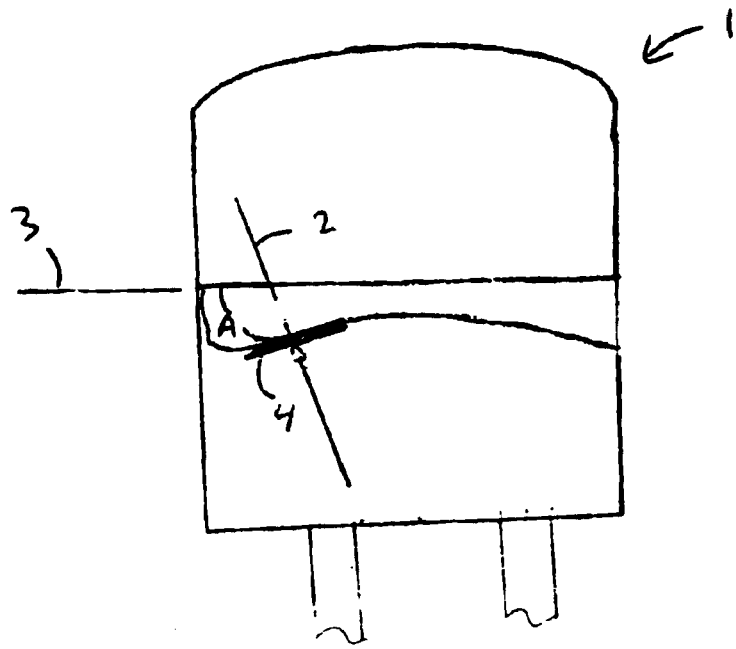
FIG. 1 is a plan view of a prior art lift truck.
Figure 2:
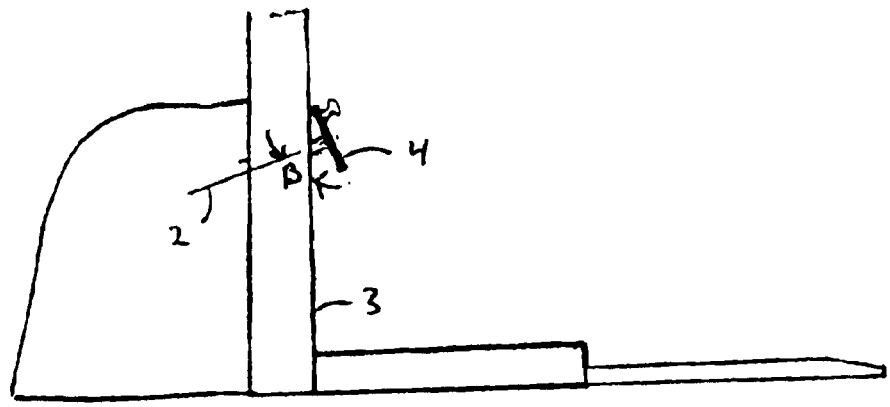
FIG. 2 is a side view of a prior art lift truck.
Figure 3:
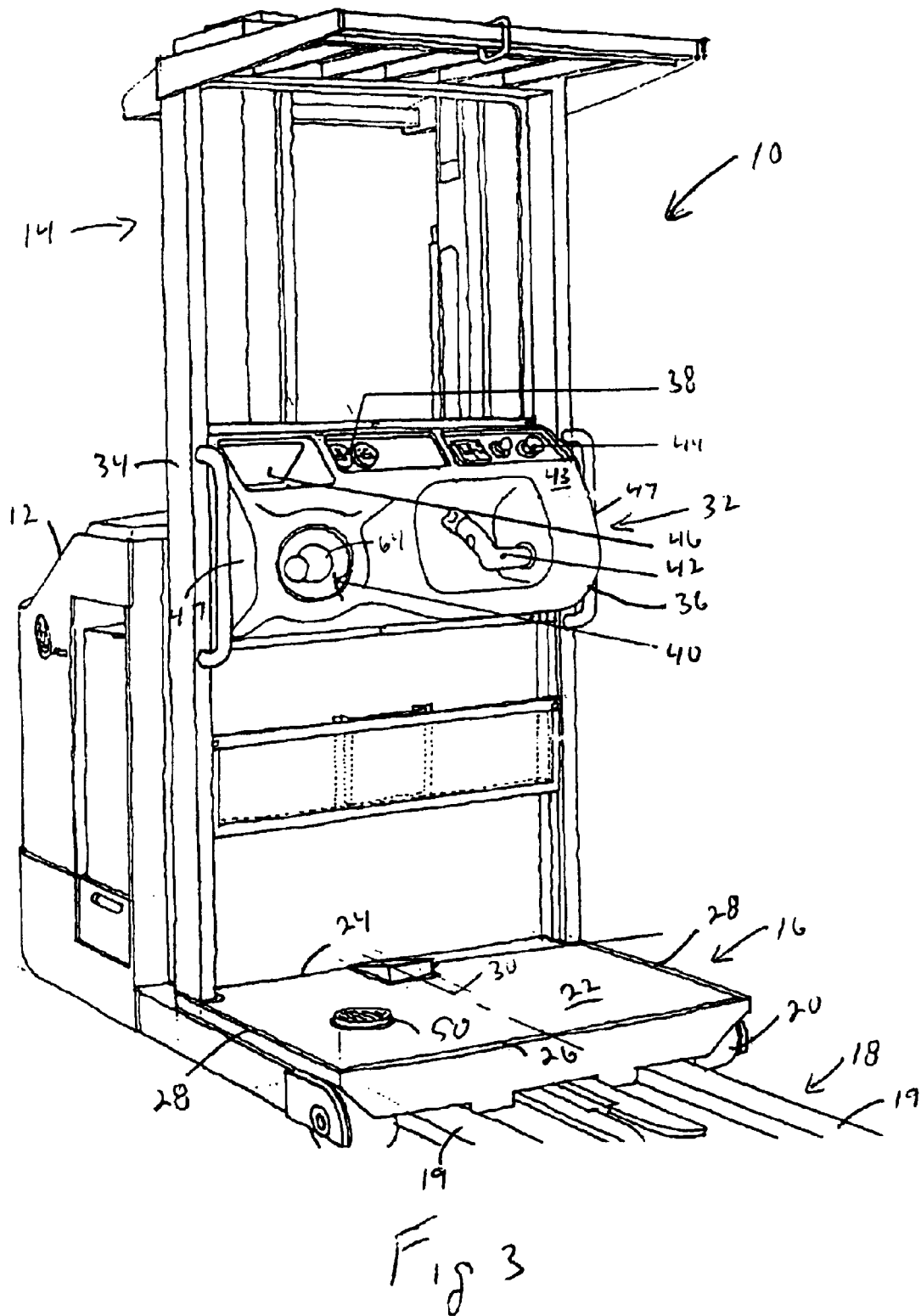
FIG. 3 is a perspective view of a lift truck incorporating the present invention.

As shown in FIG. 3, a lift truck 10 includes a motorized chassis 12 and an extendible mast assembly 14 mounted thereon. The mast assembly 14 lifts an operator platform 16 and a load platform 18 comprising a pair of forks 19 which extend from underneath the operator platform 16. The forks 19 vertically support a pallet (not shown). The lift truck 10 can be any commercially available lift truck having an operator platform 16, such as available from The Raymond Corporation, Greene, New York and BT-Prime Mover, Inc., Muscatine, Iowa.

The chassis 12 is supported by a steerable drive tire (not shown) and load support wheels 20 which engage a supporting surface, such as the ground. The drive tire is steerable by a steering motor (not shown) which changes the angle of the steerable drive tire relative to the chassis 12 to steer the truck 10. The steering motor is controlled by a controller, such as a microprocessor (not shown), as is known in the art.

The operator platform 16 includes a horizontal surface 22 on which an operator stands to operate the truck 10 and pick and place items for a customer order. The horizontal surface 22 has a forward edge 24 and rearward edge 26 joined by side edges 28. The operator platform 16 is bisected by a longitudinal centerline 30 extending through the forward and rearward edges 24, 26. Although a vertically movable operator platform is disclosed herein, the operator platform can be vertically fixed without departing from the scope of the invention.

Figure 5:
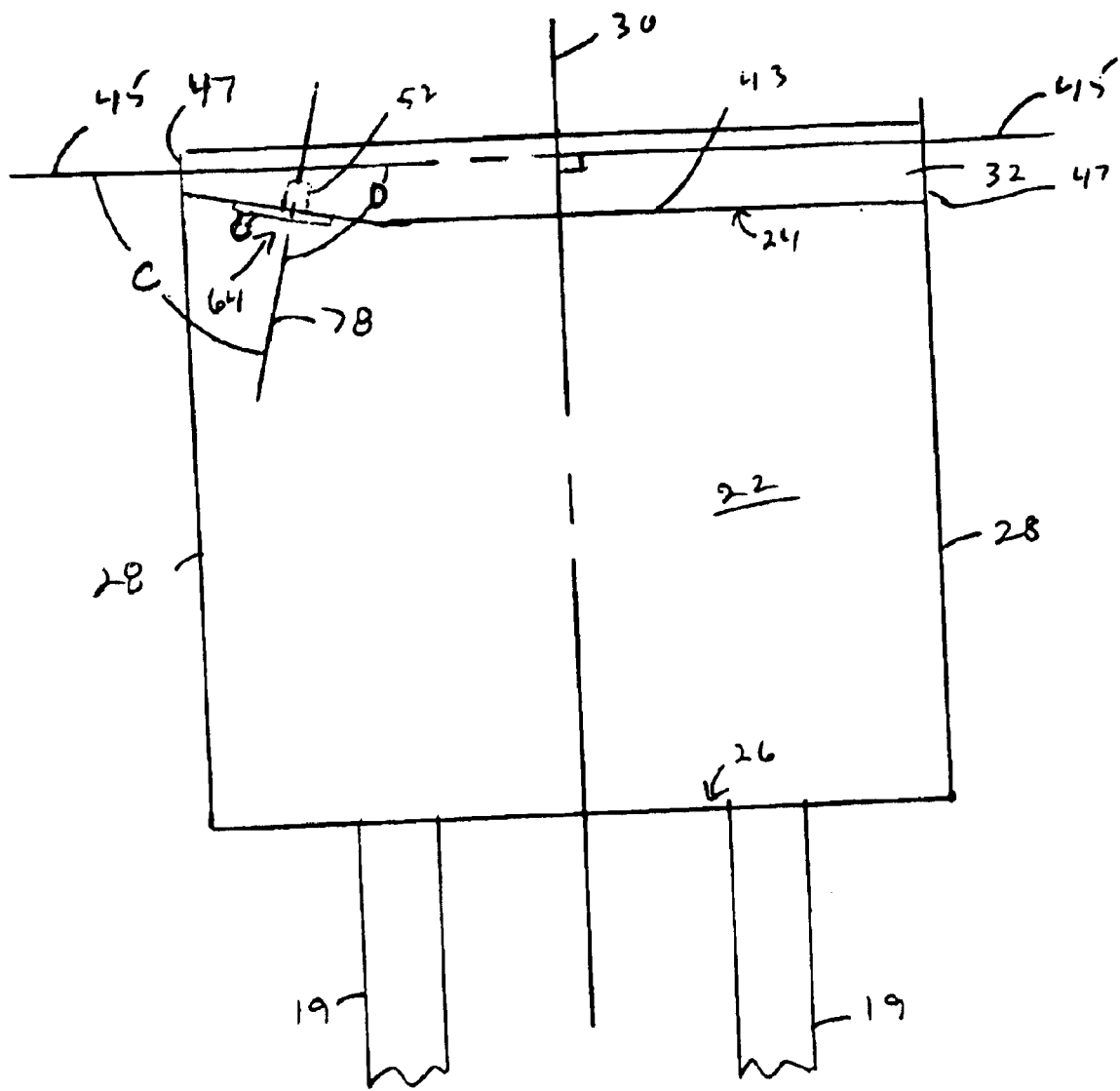
FIG. 5 is a top view of the operator platform and console of the lift truck of FIG. 3.
Figure 1:
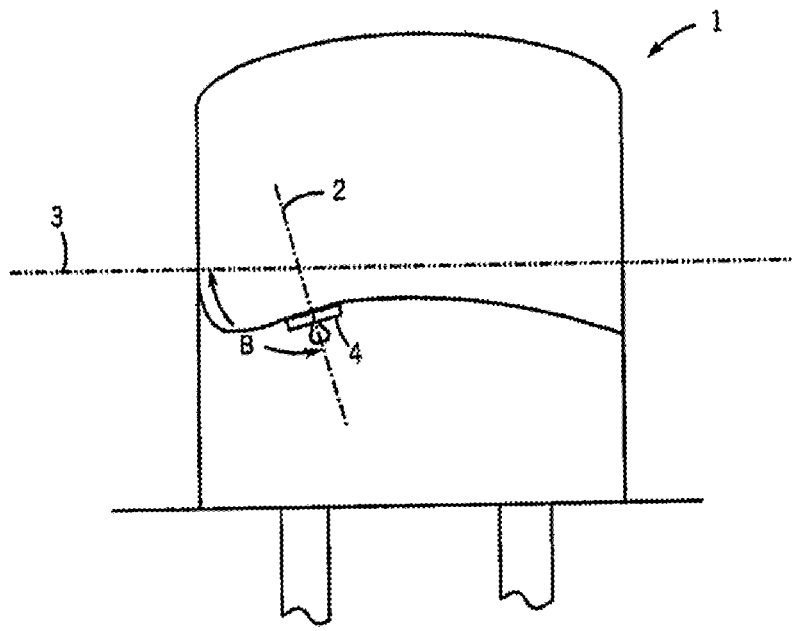
Figure 2:
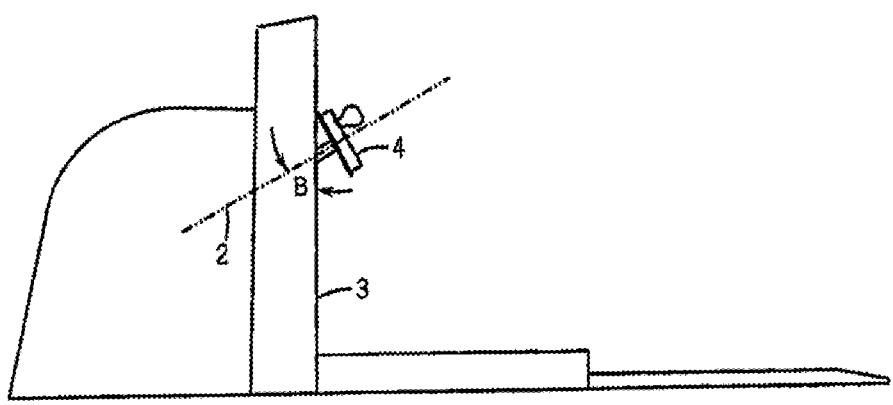
Figure 3:
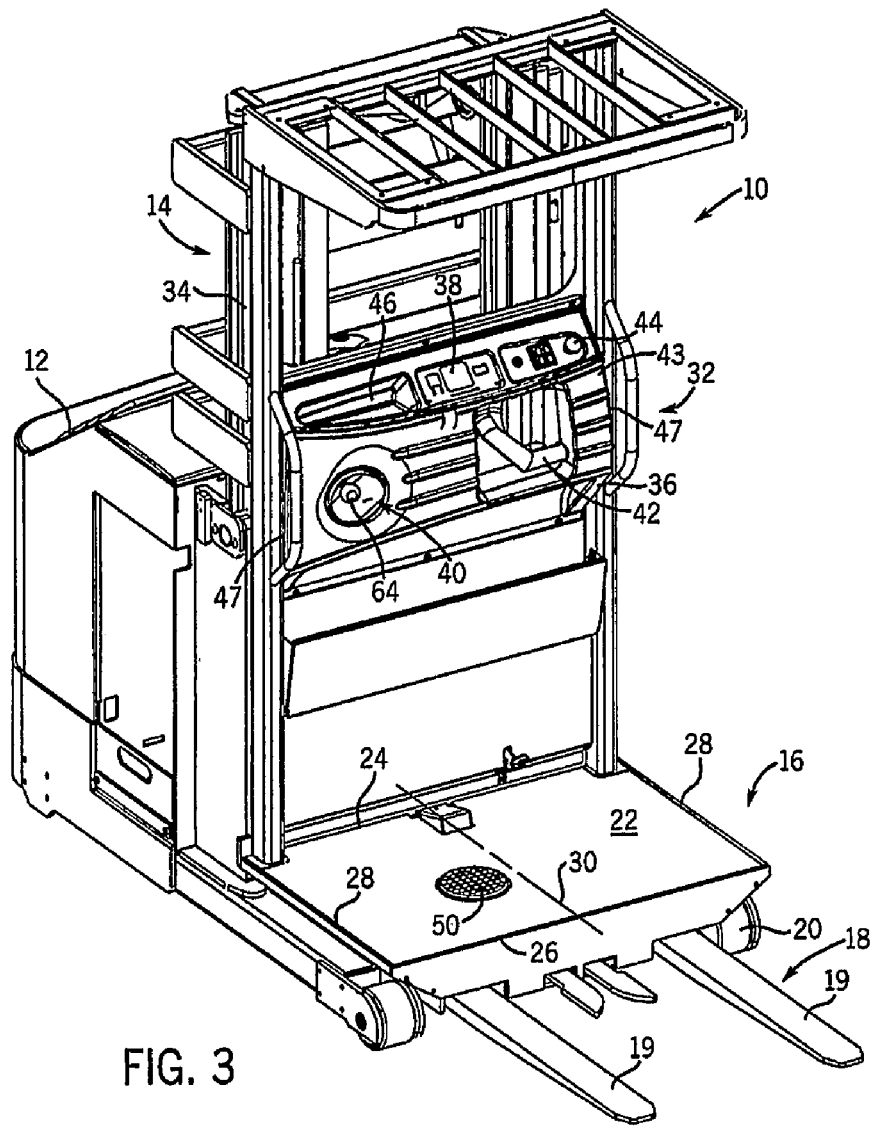
Figure 4:
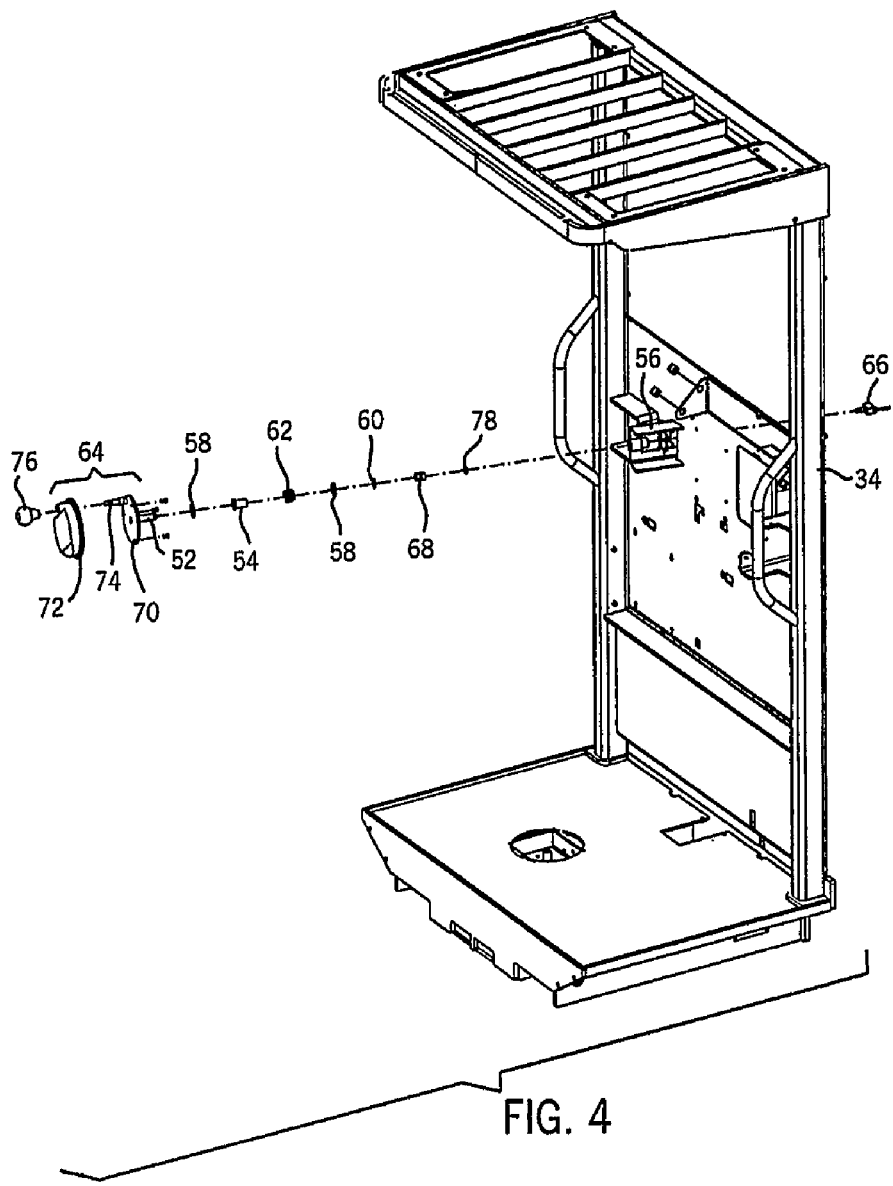
FIG. 4 is a perspective view of the operator platform and operator console frame with the operator console panel removed.
Figure 5:
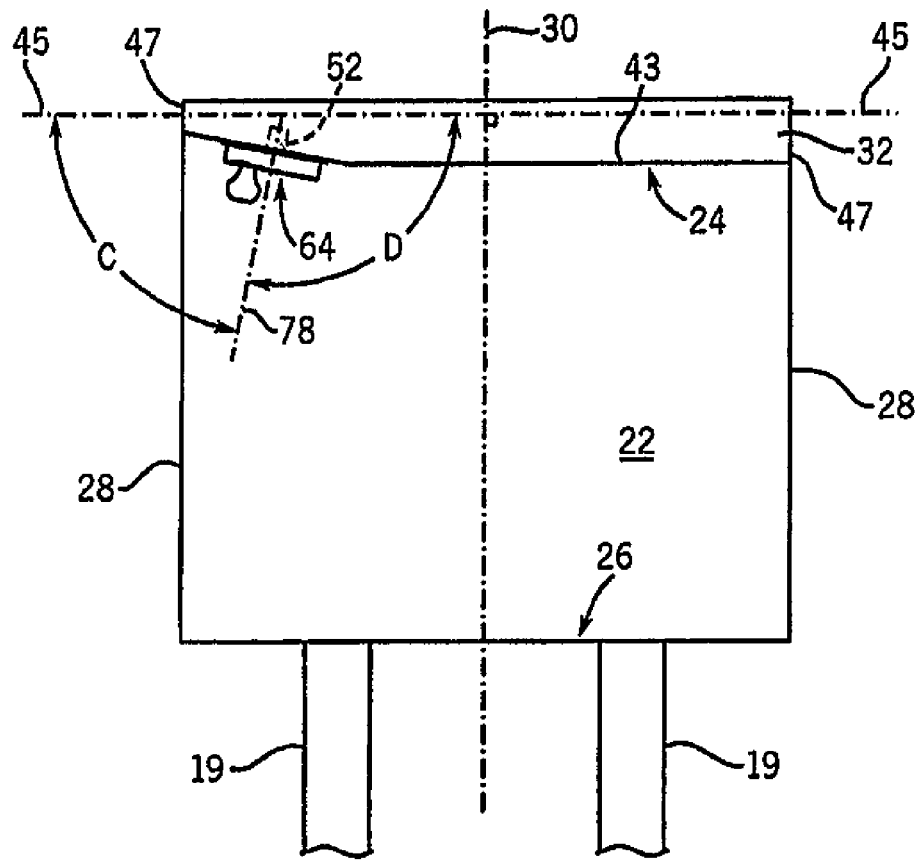

Referring to FIGS. 3–5, an operator console 32 is fixed to a frame 34 extending from the operator platform 16, and includes a formed panel 36 which houses truck wiring and mounts gauges 38, an emergency stop actuator, 44,a steering control mechanism 40, and a multifunctional control handle 42. The panel 36 has an inner face facing the frame 34, an outer face 43 facing away from the frame 34, and opposing ends 47. Advantageously, the panel 36 can be formed to provide cavities 46 for storing pencils, and the like. A transverse vertical plane 45 extending through the panel opposing ends 47 is perpendicular to the longitudinal centerline 30 bisecting the operator platform 16. Although in the preferred embodiment described herein, the longitudinal centerline extends along the direction of straight line travel of the vehicle, the longitudinal centerline could be transverse to the direction of straight line travel (i.e. a side facing operator) resulting in the vertical plane extending along the direction of straight line travel of the vehicle without departing from the scope of the invention.

The operator manipulates the steering control mechanism 40, multifunctional control handle 42, and a brake foot pedal 50 to control the horizontal movement of the lift truck 10. In particular, as is known in the art, manipulation of the multifunctional control handle 42 controls the horizontal forward and reverse speed of the lift truck 10 and the raising and lowering vertical speed of the operator platform 16, and thus the operator console 32. The foot activated brake pedal 50 extends through the operator platform horizontal surface 22, and is depressed by the operator to release the brake (not shown) and allow horizontal movement of the lift truck 10.

The steering control mechanism 40 is operatively connected to the steerable drive tire through the controller and steering motor to steer the lift truck 10. As shown in FIG. 4, the steering control mechanism 40 includes a main shaft 52 rotatably mounted to the frame 34. Preferably, the main shaft 52 extends through a bushing 54 received in a bracket 56 fixed to the frame 34. Additional components, such as a flat bushing 58, retaining ring 60, and spring 62 can be provided to rotatably mount the shaft to the frame 34. A steering wheel 64 is fixed to one end of the shaft 52, such as by welding, bolting, and the like, and is rotatable by an operator to steer the lift truck 10. The opposing end of the shaft 52 is coupled to an encoder 66 by a coupling 68.

The steering wheel 64 includes a disc 70 coaxially fixed to the one end of the main shaft 52 and a covering 72, such as plastic, which covers the disc 70. The disc 70 defines a face which faces away from the operator console 32. A spinner shaft 74 eccentrically fixed to the disc 70, such as by welding, bolting, and the like, extends through the covering 72. A spinner 76 is rotatably mounted on the spinner shaft 74, and provides a grip for an operator to easily rotate the steering wheel 64. Although a steering wheel is disclosed for rotating the shaft, other structure can be provided, such as a rotatable arm with or without a spinner rotatably fixed thereto can be fixed to the shaft, without departing from the scope of the invention.

Importantly, the main shaft 52 rotates about a shaft axis 78 which defines an acute angle C and obtuse angle D with the console vertical plane 45. As shown in FIG. 5, the acute angle C is defined rearwardly of the console vertical plane 45 and opens away from the longitudinal centerline 30, such that the steering wheel 64 face faces away from an operator operating the lift truck 10. In other words, the shaft axis 78 extends rearwardly from the vertical plane 45 away from the centerline 30. Advantageously, facing the steering wheel 64 away from the operator maintains the operator's wrist in an ergonomically preferred operating position throughout the steering wheel's range of motion. By providing a steering wheel orientation which follows the natural operation of an operator's wrist throughout the rotation of the steering wheel 64, operator fatigue is reduced compared to prior art.

Preferably, the main shaft 52 defines an angle C which is approximately 75°. Of course, the perfect angle C for any specific operator is dependent upon the specific dimensions of the operator. An angle C of 75° is preferred, however, because a shaft angle of 75° is believed to comfortably accommodate a range of operators. Angle C can, however, be any angle less than 90° without departing from the scope of the invention. Most preferably, however angle C is greater than 0° and less than 90° to benefit from the ergonomic positioning of the main shaft 52 without requiring an operator to overextend a limb to rotate the steering wheel 64.

Referring back to FIGS. 3 and 4, the encoder 66 operatively connected to the opposing end of the main shaft 52 is electrically connected to the controller. As is known in the art, the controller receives signals from the encoder to determine direction and degree of rotation of the shaft, and thus the steering wheel. In response to the signals, the controller controls the steering motor which changes the angle of the steerable drive tire relative to the chassis to change the horizontal direction of the moving vehicle. Of course, the main shaft can be operatively connected to the steerable drive tire using other methods known in the art, such as by mechanically linking the steering control mechanism to the steerable drive tire, without departing from the scope of the invention.

In operation, the operator drives the lift truck 10 with the left foot on a brake pedal 50, the left hand on a vehicle steering wheel 64, and the right hand on a multi-functional control handle 42. Rotation of the steering wheel 64 changes the angle of the steerable drive tire supporting the vehicle chassis 12, resulting in a different horizontal direction of travel. The angled steering wheel 64 allows lift truck steering by the operator using the natural operation of the operator's wrist throughout the range of steering wheel rotation to minimize operator fatigue caused by unnatural operation of the operator's wrist.

While there has been shown and described what are at present considered the preferred embodiments of the invention, it will be obvious to those skilled in the art that various changes and modifications can be made therein without departing from the scope of the invention defined by the appended claims.

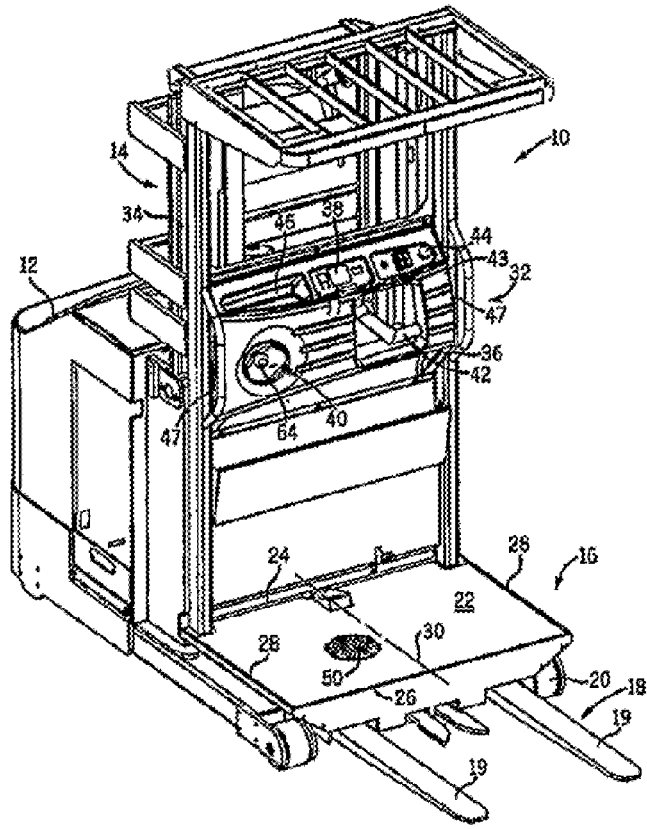

I claim:

1. A vehicle comprising:
an operator platform having a platform front edge and a platform rear edge joined by opposing platform sides, said operator platform being bisected by a longitudinal centerline extending through said front and rear edges;
an operator console mounted relative to said operator platform and extending along a vertical plane intersecting said longitudinal centerline, said vertical plane being substantially perpendicular to said longitudinal centerline; and a steering control mechanism having a rotatable shaft extending through said operator console for rotation about an axis, said axis intersecting said vertical plane at a point offset from said longitudinal centerline and defining an acute angle and an obtuse angle with said vertical plane, wherein said acute angle is defined rearwardly of said vertical plane and opens away from said longitudinal centerline.

2. The vehicle as in claim 1, in which said acute angle is no less than 0°.

3. The vehicle as in claim 1, in which said acute angle is less than 90°.

4. The vehicle as in claim 1, in which said steering control mechanism shaft has rearwardly extending end, and a steering wheel is fixed to said shaft end for engagement by an operator.

5. A vehicle comprising:
   an operator platform having a platform front edge and a platform rear edge joined by opposing platform sides, said operator platform being bisected by a longitudinal centerline extending through said front and rear edges;
   an operator console mounted relative to said operator platform and extending along a vertical plane intersecting said longitudinal centerline, said vertical plane being substantially perpendicular to said longitudinal centerline; and
   a steering control mechanism having a rotatable shaft extending through said operator console for rotation about an axis, said axis extending rearwardly from said vertical plane away from said longitudinal centerline, wherein said axis defines an acute angle and an obtuse angle with said vertical plane, wherein said acute angle is defined rearwardly of said vertical plane and opens away from said longitudinal centerline.

6. The vehicle as in claim 5, in which said acute angle is no less than 0°.

7. The vehicle as in claim 5, in which said acute angle is less than 90°.

8. The vehicle as in claim 5, in which said steering control mechanism shaft has a rearwardly extending end, and a steering wheel is fixed to said shaft end for engagement by an operator.

9. An operator console suitable for use on an order picker lift truck, said operator console comprising:
   an operator console panel having opposing ends and being fixable to a lift truck frame, said console panel, wherein a vertical plane extends perpendicular to a centerline interposed between said opposing ends, said vertical plane having a forward side and a rearward side; and
   a steering control mechanism including a rotatable shaft extending through said panel and said vertical plane, said shaft having a first end disposed on said forward side of said vertical plane and a second end disposed on said rearward side of said vertical plane, said shaft having a shaft axis of rotation extending rearwardly from said vertical plane away from said centerline, said shaft axis of rotation intersecting said vertical plane at a point offset from said centerline and defining an acute angle and an obtuse angle with said vertical plane, wherein said acute angle is defined rearwardly of said vertical plane and opens away from said centerline.

10. The operator console as in claim 9, in which said acute angle is no less than 0°.

11. The operator console as in claim 9 in which said acute angle is less than 90°.

12. The operator console as in claim 9, in which a steering wheel is fixed to said shaft second end for engagement by an operator.

* * * * *

UNITED STATES PATENT AND TRADEMARK OFFICE
CERTIFICATE OF CORRECTION

PATENT NO. : 6,793,247 B2 Page 1 of 6
APPLICATION NO. : 10/189981
DATED : September 21, 2004
INVENTOR(S) : Swetish It is certified that error appears in the above-identified patent and that said Letters Patent is hereby corrected as shown below:

Substitute the Print Fig on Title Page and Figs 1-5 As shown in attached

Signed and Sealed this

Eighteenth Day of September, 2007

JON W. DUDAS
*Director of the United States Patent and Trademark Office*

(12) United States Patent
Swetish

(10) Patent No.: US 6,793,247 B2
(45) Date of Patent: Sep. 21, 2004

(54) ORDER PICKER ANGLED STEERING WHEEL

(75) Inventor: Gary B. Swetish, Racine, WI (US)

(73) Assignee: The Raymond Corporation, Greene, NY (US)

(*) Notice: Subject to any disclaimer, the term of this patent is extended or adjusted under 35 U.S.C. 154(b) by 47 days.

(21) Appl. No.: 10/189,981

(22) Filed: Jul. 3, 2002

(65) Prior Publication Data
US 2004/0004349 A1 Jan. 8, 2004

(51) Int. Cl.$^7$ .............................................. B62D 1/18
(52) U.S. Cl. .................................................. 280/775
(58) Field of Search .......................... 280/771, 775; 74/492, 493

(56) References Cited

U.S. PATENT DOCUMENTS

| | | | |
|---|---|---|---|
| 3,807,252 A | 4/1974 | Parr | 74/493 |
| 4,287,787 A * | 9/1981 | Kulhanek | 74/493 |
| 4,392,670 A | 7/1983 | Schultz | 280/775 |
| 4,674,769 A * | 6/1987 | Ota et al. | 280/775 |
| 5,573,273 A * | 11/1996 | Ito | 280/775 |
| D407,177 S | 3/1999 | Henshaw et al. | D34/34 |
| 5,890,562 A | 4/1999 | Bartels et al. | 187/224 |
| 6,182,778 B1 | 2/2001 | Henshaw et al. | 180/89.12 |
| D440,373 S | 4/2001 | Meinhardt | D34/34 |

* cited by examiner

Primary Examiner—Faye M. Fleming
(74) Attorney, Agent, or Firm—Quarles & Brady LLP

(57) ABSTRACT

A vehicle including an operator platform having a platform front end and a platform rear end joined by opposing platform sides. The operator platform is bisected by a longitudinal centerline extending through the front and rear ends. An operator console is mounted relative to the platform and extends along a vertical plane bisected by the longitudinal centerline. The vertical plane is substantially perpendicular to the longitudinal centerline. A steering control mechanism rotatably is mounted to the operator console for rotation about an axis. The axis is arranged to allow natural movement of an operator's wrist to minimize fatigue.

12 Claims, 4 Drawing Sheets